United States Patent Office 2,902,843
Patented Sept. 8, 1959

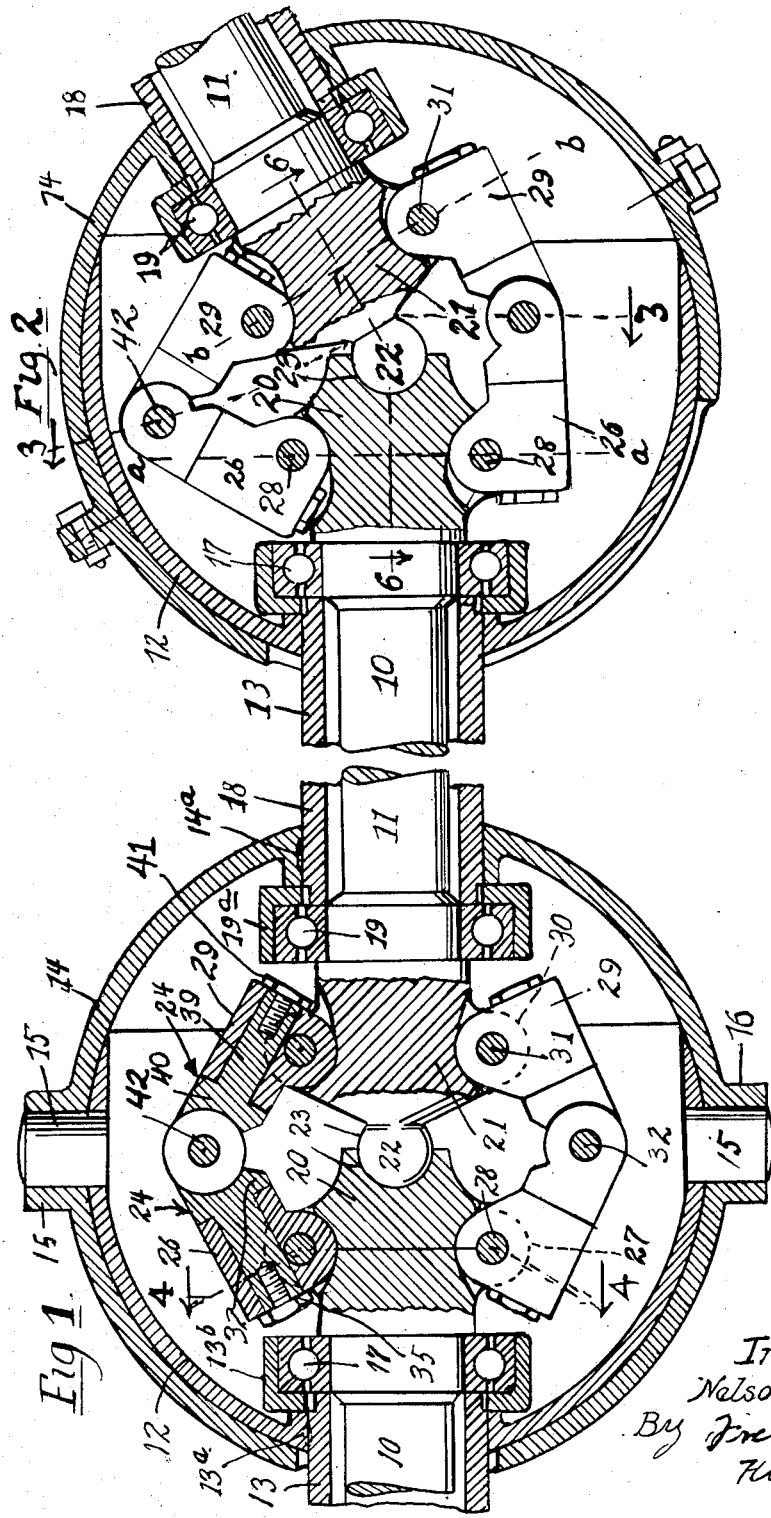

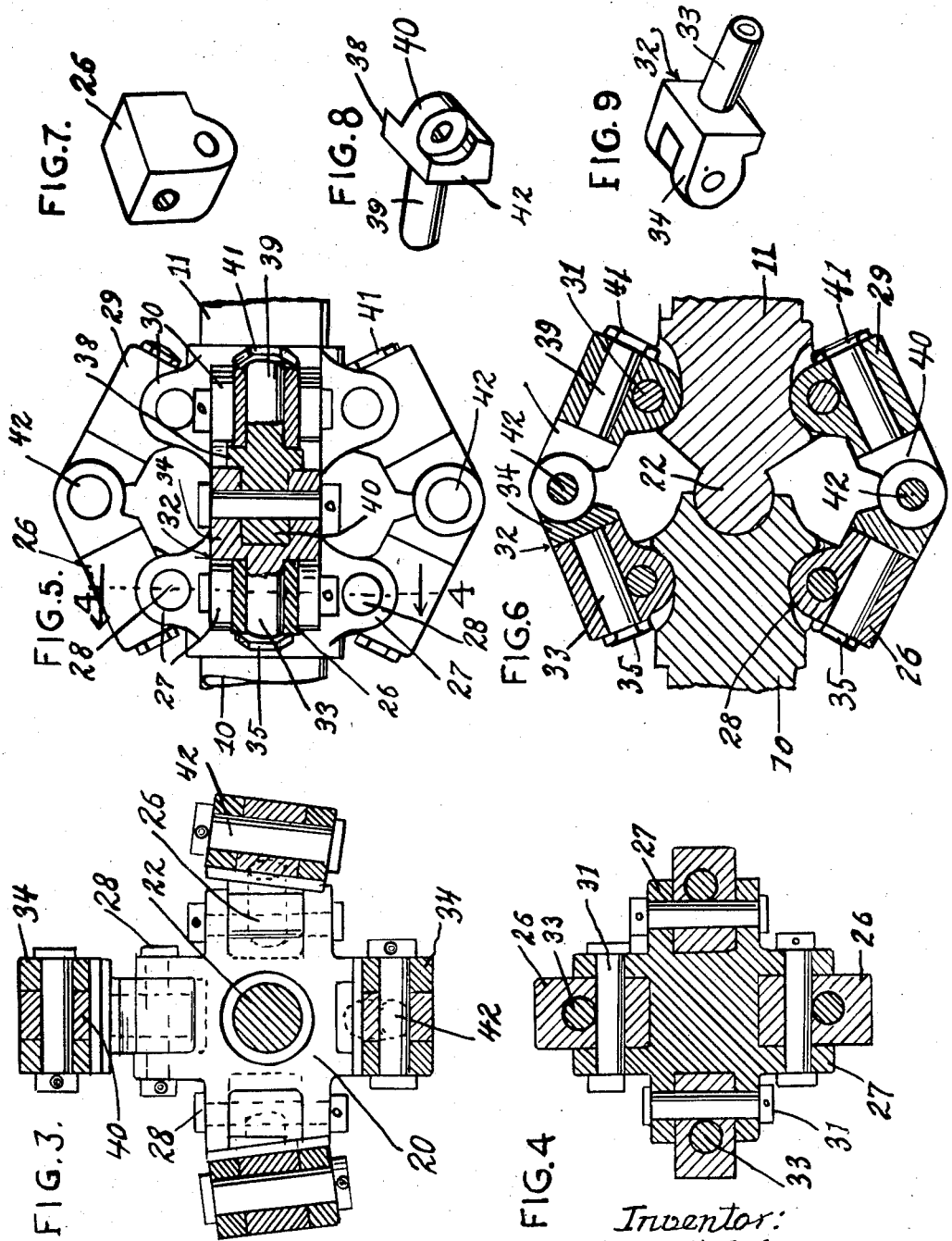

2,902,843

DRIVING MECHANISM WITH FLEXIBLE JOINTS

Nelson H. Forbes, Chicago, Ill.

Application September 5, 1957, Serial No. 682,108

6 Claims. (Cl. 64—19)

The invention relates to universal joints for propelling an output shaft from an angularly related drive or power input shaft.

One object of the invention is to provide a joint of this character which minimizes the losses in torque from the angular driving relation of the drive and driven shafts.

Another object of the invention is to provide an improved construction of relatively adjustable housing sections in which the shafts of a universal joint are supported in close relation for operation by coupling devices in the housing.

Other objects will appear from the detailed description.

The invention consists in the several novel features of construction hereinafter set forth and more particularly defined by claims at the conclusion hereof.

In the drawings:

Fig. 1 is a section of a joint exemplifying the invention, parts being shown in elevation, the drive and driven shafts being in axially aligned relation;

Figure 2 is a section taken at right angles to Fig. 1, the driven shaft being supported in angular relation to the drive shaft, parts being shown in elevation;

Fig. 3 is a section taken on line 3—3 of Fig. 2;

Fig. 4 is a section taken on line 4—4 of Fig. 1;

Fig. 5 is a plan of the shafts in axial alignment, one of the linkages being shown in section;

Fig. 6 is a section similar to Fig. 1, the linkages and shafts being shown in section;

Fig. 7 is a detailed perspective view of one of the pivot blocks which are mounted to swing longitudinally of the shafts and in which a stem of a link pin is journalled for rotation on its own axis;

Fig. 8 is a perspective view of one of the link pins of each connected pair; and Fig. 9 is a perspective of the other link pin of each pair.

The invention is exemplified in a flexible or universal drive coupling between shafts 10 and 11, either of which may be connected to a source of power and function as a drive shaft while the other may function as a driven or output shaft. The shafts are supported and journalled for rotation in a housing which comprises a spherical section 14 which may be supported in any suitable manner and a section 12 which telescopically fits in, and is supported for pivotal movement in, a transverse plane by trunnions 15 which are pivotally supported in diametrically opposite hubs 16 on housing section 14. The shaft 10, is journalled and supported in housing section 12 which for descriptive purposes may be assumed to be the driving or power shaft. Shaft 11 is journalled in the pivotally supported housing section 14 and may be assumed to be the driven or output shaft. A sleeve or torque tube 13 extends through and is welded at 13a in a hub on the inner housing section 12. A collar 13b has a spline connection with the inner end of tube 13 and shaft 10 is journalled in a ball bearing 17 which is confined in collar 13b and is provided with an integral head 20 inwardly of said bearing 17. Shaft 11 is housed in a sleeve or torque tube 18 which is welded at 14a in the outer housing section 14 and journalled in a ball bearing 19 which is retained in a collar 19a which is splined to sleeve 18. A head 21 is integrally formed inwardly of bearing 19 on shaft 11. Head 20 on shaft 10 has a hemispherical socket 23 and a ball 22 integral with head 21 fits in and has piloted thrust engagement with said socket for retaining the shafts against relative endwise movement while permitting the shaft 11 to swing with the outer housing section 14 which is pivotally movable in one plane on trunnions 15. The outer housing section 14 is pivotally movable on the transverse axis of trunnions 15 which intersects the longitudinal axes of shafts 10 and 11 when they are axially aligned so that housing section 14 may be pivotally shifted on the transverse axis extending through the trunnions 15 on housing section 12 and ball 22 to position shaft 11 in different angular relations to shaft 10, within the plane of pivotal movement permitted by trunnions 15, for example, from the aligned relation shown in Fig. 1 to the angular relation shown in Fig. 2.

Shafts 10 and 11 are connected for continuous driving relation by four linkages, generally designated 24, symmetrically spaced around and operative when said shafts are axially aligned or in angular relation. Each linkage 24 comprises: toggle-link structure including a pivot block 26 confined sidewise between lugs or ears 27 integral with head 20 on shaft 10 and pivotally connected thereby by a crosspin 28 which extends through said ears 27, for rotation bodily with said shaft and pivotal movement on the axis of said pin in a plane extending longitudinally of said shaft; a pivot block 29 sidewise confined between lugs or ears 30 integral with head 21 on shaft 11 and pivotally connected to head 21 by a crosspin 31 extending through said ears 30, for rotation bodily of block 29 with, and pivotal movement on, the axis of said pin in a plane extending longitudinally of shaft 11; a link member 32 having a cylindrical stem 33 extending longitudinally through and journalled in block 26 and confined against endwise movement in said block by a bifurcated terminal 34 having abutting relation with one end of block 26 and a screw 35 threaded into stem 33 provided with a head abutting the opposite end of block 26 for permitting rotation of stem 33 and link member 32 on the axis of said stem in block 26 which rotates bodily with shaft 10 and is pivotally movable longitudinally of said shaft; a link member 38 having a stem 39 extending longitudinally through and journalled in block 29 and confined endwise in said block by a terminal 40 at one of its ends and a screw 41 threaded into stem 39 and abutting the opposite end of block 29; and a pin 42 extending longitudinally through the bifurcated terminal on link member 32 and the terminal 40 on link member 38 which interfits with the bifurcated terminal 34 for conjointly rotating the link members in the pivot blocks respectively. Blocks 26 and 29 operate as inner and members 32 and 40 as outer links of a pivotally connected pair. These linkages including a pair of links are adapted to continuously drive one of the shafts from the other while they are coaxially aligned or in angular relation.

The operation will be as follows: When the shafts 10 and 11 are axially aligned as illustrated in Fig. 1, shaft 10 when driven will solidly rotate all of the linkages and drive them bodily to drive shaft 11 without relative movement between the shafts or relative movement of the elements of the linkages. The linkages will deliver power to the output shaft with no substantial loss of torque. All the linkages will be operated around the shafts with the same efficiency as a rigid driving connection. When the shaft 11 is shifted into one of its angular positions relatively to shaft 10 as exemplified in Fig. 2, the bearings 17 and 19 in housing sections 12 and 14 will be supported in predetermined angular and endwise spaced relation in the housing sections. When the shafts are angularly related as exemplified in Fig. 2, the pins 28 on which blocks 26 are pivoted will be rotated bodily with shaft 10 in a transverse plane at a right angle to the axis of shaft 10 and the pins 31 on which blocks 29 are pivoted to shaft 11 will rotate bodily in a transverse plane at right angles to the axis of said shaft 11. Linkages 24 will be operated to continuously drive shaft 11 on its axis and in angular relation to shaft 10. In this operation, pins 28, 31 and 42 permit the links 34 and 38 to swing longitudinally of and relatively to the shafts and to one another and the stems of said links to rotate on their own axes in the pivot blocks 26 and 29 during each cycle of rotation of said shafts. The pivot pins 42 between the interfitting terminals 34 and 40 on links 32 and 38 and the stems 33 and 39 rotatable in blocks 26 and 29 form swivel connections between the links 32 and 38 to maintain the driving relation during the relatively angular positions of shafts 10 and 11. During each cycle of rotation of shaft 10, the links 32 and 38 of each connected pair will be longitudinally aligned as they travel across or intersect at diametrically opposite points, the transverse plane on which Fig. 2 is taken. Between said diametrically opposite points, the connected pairs of links will swivel in blocks 26 and permit said blocks to rotate in a transverse plane at right angles to the axis of, and with shaft 10, and permit the block 29 to rotate in a transverse plane at a right angle to the axis of and with shaft 11. During each half revolution cycle, the swivel action of links 34 and 38 will gradually increase and decrease and maintain the driving relation in the linkages and between angularly related shafts 10 and 11 with a minimum loss of torque in the transmission of power.

During operation of shaft 10 while shaft 11 is adjusted into angular relation shown in Fig. 2, pins 28 between the inner of link-members 26 will rotate bodily in the transverse plane a—a (Fig. 2) at a right angle to the axis of shaft 10, pins 31 between the link-members 29 and shaft 11 will rotate bodily in the transverse plane b—b (Fig. 2), at a right angle to the axis of shaft 11, the planes being downwardly divergent. Pins 42 between the links of each connected pair will travel in a differential path from the planes travelled by pins 28 and 31, and the links of each connected pair will spread apart during their travel of about 180° from position shown at the upper portion of Fig. 2, and pivotally fold together during substantially the remaining 180° cycle, of each revolution of shafts 10 and 11. To compensate for, or permit the necessary differential travel of the pivot-pins 42 between the links of each pair, and maintain constant driving relation of the linkages during each full cycle travel of 360°, and with minimum loss of driving torque, the interfitting terminals 34 and 40 on the outer end of each pivotally connected pair of links, during their longitudinal folding together and spreading apart cycles, the stems 33 and 39 will individually rotate or swivel in the inner link-members of each pair. This swivel action permits the continuous rotation of, and transmits substantial uniform torque between, the shafts 10 and 11 during the full rotative cycle of the linkages.

The invention exemplifies driving-linkages between angularly adjustable shafts, which are constantly operative with a minimum loss of torque during their rotation on angularly related axes, are simple in construction, and efficient in operation.

The construction of the housing sections, the torque tubes, and the journal for the shafts has the characteristic attributes of economical fabrication and assembly; supporting the bearings for the angularly variable shafts in close relation; and making it possible to use compactly related linkages.

The invention is not to be understood as restricted to the details set forth since these may be modified within the scope of the appended claims without departing from the spirit and scope of the invention.

Having thus described the invention what I claim as new and desire to secure by Letters Patent is:

1. In a universal driving mechanism, driving means and driven means comprising a driving shaft and a driven shaft retained axially and centrally within torque tubes and centrally within a spherical housing by ball-bearings on the ends of said torque tubes, block supporting ears formed on said shafts, stem supporting driving blocks and stem supporting driven blocks retained in operable assembly with said ears by pivot cross-pins, driving stems and driven stems supported in said blocks and hingedly connected by cross-pins, said driving stems and said driven stems being journalled through driving and driven blocks respectively and retained in operable assembly with said driving and driven blocks by cap-screws.

2. In a universal driving mechanism, as stated in claim 1, wherein said driving shaft and said driven shaft have block supporting ears formed integrally with said driving shaft and with said driven shaft respectively, said pairs of block supporting ears being outwardly offset symmetrically from the axis of said driving shaft and said driven shaft respectively.

3. In a universal driving mechanism, as stated in claim 1, wherein said stem supporting driving blocks and said stem supporting driven blocks are retained in operable assembly with pairs of said ears by pivot cross-pins, and stem supporting driving blocks and said stem supporting driven blocks being outwardly offset symmetrically from the axis of said driving shaft and said driven shaft respectively.

4. In a universal driving mechanism, a stated in claim 1, wherein said hingedly connected driving stems and driven stems are journalled through driving blocks and through driven blocks respectively, said driving stems and said driven stems being outwardly offset from said pivot cross-pins and outwardly offset symmetrically from the axis of said driving shaft and from the axis of said driven shaft respectively.

5. In a universal driving mechanism, as stated in claim 1, wherein said hingedly connected driving stems and driven stems are axially retained in operable assembly with driving blocks and driven blocks respectively by cap-screws threaded in the ends of said driving stems and said driven stems.

6. In a universal driving mechanism, as stated in claim 1, wherein said driving means are outwardly retained in predetermined spaced relation to said driven means by ball-bearings confined within ball-bearing housings, said ball-bearing housings being connected to the ends of said torque tubes and within said spherical housing, said spherical housing being in fixed connection with said torque tubes.

References Cited in the file of this patent

UNITED STATES PATENTS

| | | |
|---|---|---|
| 125,880 | Clemens | Apr. 23, 1872 |
| 545,353 | Fenner | Aug. 27, 1895 |
| 867,551 | Bogart | Oct. 1, 1907 |
| 1,342,300 | Sheler et al. | June 1, 1920 |
| 1,887,755 | Gerold | Nov. 15, 1932 |
| 2,721,458 | Bouchard | Oct. 25, 1955 |
| 2,827,777 | Molyneux et al. | Mar. 25, 1958 |

FOREIGN PATENTS

| | | |
|---|---|---|
| 787,925 | France | July 16, 1935 |